United States Patent [19]

Brow et al.

[11] Patent Number: 5,262,364
[45] Date of Patent: Nov. 16, 1993

[54] HIGH THERMAL EXPANSION, SEALING GLASS

[75] Inventors: Richard K. Brow; Larry Kovacic, both of Albuquerque, N. Mex.

[73] Assignee: The United States of America as represented by the United States Department of Energy, Washington, D.C.

[21] Appl. No.: 764,254

[22] Filed: Sep. 23, 1991

[51] Int. Cl.$^5$ ............................. C03C 8/08; C03C 3/17
[52] U.S. Cl. .................................... 501/24; 501/22; 501/47; 501/48
[58] Field of Search .................. 501/22, 24, 47, 48

[56] References Cited

U.S. PATENT DOCUMENTS

| | | | |
|---|---|---|---|
| 3,957,496 | 5/1976 | Eagan | 106/39.8 |
| 4,000,998 | 1/1977 | Rittler | 65/33 |
| 4,026,714 | 5/1977 | Lewis | 106/47 R |
| 4,060,422 | 11/1977 | Asahara | 106/47 Q |
| 4,135,936 | 1/1979 | Ballard, Jr. | 106/39.6 |
| 4,202,700 | 5/1980 | Wilder, Jr. | 106/39.6 |
| 4,365,021 | 12/1982 | Pirooz | 501/15 |
| 4,438,210 | 3/1984 | Rittler | 501/4 |
| 4,455,384 | 6/1984 | Day et al. | 501/15 |
| 4,847,219 | 7/1989 | Boatner et al. | 501/24 X |

FOREIGN PATENT DOCUMENTS 0169572 9/1985 Japan .................... 501/24

OTHER PUBLICATIONS

Doremus, *Glass Science*, Wiley & Sons (1973) pp. 162–165.
G. Greaves et al., "A Structural Basis For the Corrosion Resistance of Lead-Iron-Phosphate Glasses: An X-Ray Absorption Spectroscopy Study", Philosophical Magazine B, 1988, vol. 58, No. 3, pp. 271–283.

*Primary Examiner*—Karl Group
*Attorney, Agent, or Firm*—Russell D. Elliott; James H. Chafin; William R. Moser

[57] ABSTRACT

A glass composition for hermetically sealing to high thermal expansion materials such as aluminum alloys, stainless steels, copper, and copper/beryllium alloys, which includes between about 10 and about 25 mole percent $Na_2O$, between about 10 and about 25 mole percent $K_2O$, between about 5 and about 15 mole percent $Al_2O_3$, between about 35 and about 50 mole percent $P_2O_5$ and between about 5 and about 15 mole percent of one of PbO, BaO, and mixtures thereof. The composition, which may also include between 0 and about 5 mole percent $Fe_2O_3$ and between 0 and about 10 mole percent $B_2O_3$, has a thermal expansion coefficient in a range of between about 160 and $210 \times 10^{-7}/°C$. and a dissolution rate in a range of between about $2 \times 10^{-7}$ and $2 \times 10^{-9}$ g/cm$^2$-min. This composition is suitable to hermetically seal to metallic electrical components which will be subjected to humid environments over an extended period of time.

10 Claims, No Drawings

HIGH THERMAL EXPANSION, SEALING GLASS

RIGHTS OF THE GOVERNMENT

The United States Government has rights in this invention pursuant to Contract No. DE-AC04-76DP000789 awarded by the U.S. Department of Energy to American Telephone & Telegraph Company.

BACKGROUND OF THE INVENTION

1. Field of the Invention

The present invention relates generally to glass compositions and, more particularly, to a high thermal expansion, high durability glass for hermetically sealing to high expansion materials such as copper, stainless steels, alloys of aluminum, and copper/beryllium alloys.

2. Description of the Prior Art

It is preferable to utilize glass as the electrically insulating medium for metallic components employed in electrical devices such as vacuum tubes, explosive detonators, pyrotechnic devices, accelerator switches, connectors, and the like. Glass is desirable for use in these applications because it is capable of forming a complex mechanical seal and is characterized in having a low gas permeability, a high chemical durability, a high mechanical strength and a high electrical resistivity. However, if high thermal expansion metals, such as aluminum or stainless steel, are employed in electrical devices, the glass utilized as the electrically insulating medium must also have a thermal expansion coefficient which closely matches the thermal expansion coefficient of the high thermal expansion metal. This close match is required to avoid mechanical stresses on cooling and permit a hermetic seal to be formed between the metal and the glass. As is well known in the art, forming a hermetic seal between the metal and the glass greatly reduces the possibility of moisture-induced denigration or failure of the metal.

Compositions formed from glass and ceramics for sealing to molybdenum are disclosed in U.S. Pat. No. 3,957,496 and for sealing to stainless steel are disclosed in U.S. Pat. No. 4,135,936. These compositions each require temperatures in excess of 900° C. to form the seal and devitrify the glass. The high seal-forming temperatures of these compositions preclude their use in practice with metals, such as aluminum, since the seal-forming temperatures are greater than the melting points of these metals.

U.S. Pat. No. 4,202,700 to Wilder, Jr. discloses a glassy composition adaptable for hermetically sealing to aluminum-based alloys. The composition may either be employed as a glass or a glass-ceramic and includes from about 10 to about 60 mole percent $Li_2O$, $Na_2O$, or $K_2O$, from about 5 to about 40 mole percent BaO or CaO, from 0.1 to 10 mole percent $Al_2O_3$ and from 40 to 70 mole percent $P_2O_5$. Although this composition has a thermal expansion coefficient which closely matches the thermal expansion coefficient of stainless steel, its aqueous durability (dissolution rate) is relatively poor. This shortcoming precludes its use in electrical devices which require long operating lifetimes in humid environments.

It is apparent from what is presently known in the art that a need exists generally for a glass composition which may be hermetically sealed to high thermal expansion metals such as aluminum or stainless steel. In particular, a need exists for a glass composition for hermetically sealing to aluminum or stainless steel which has an aqueous dissolution rate at least an order of magnitude better than the dissolution rates of glasses presently known and utilized. In addition, the glass composition should have a thermal expansion coefficient which closely matches the thermal expansion coefficient of aluminum or stainless steel to permit the hermetic seal to be maintained as the aluminum or stainless steel expands and contracts, and a hermetic sealing temperature below the melting temperature of aluminum or aluminum alloys to permit the seal to be formed without melting either of the metals.

SUMMARY OF THE INVENTION

The present invention provides a glass composition designed to satisfy the aforementioned needs. The composition has a thermal expansion coefficient in a range of between about 160 and about $210 \times 10^{-7}$/° C. to permit satisfactory hermetic sealing to high thermal expansion materials such as copper, stainless steels, aluminum alloys, and copper/beryllium alloys. In addition, the composition has a dissolution rate (in 70° C. water) in a range of between about $2 \times 10^{-7}$ and $2 \times 10^{-9}$ g/cm$^2$-min to permit its use in electrical devices subjected to humid environments over long periods of time.

In accordance with the present invention, there is provided a glass composition for hermetically sealing to high thermal expansion metals, which includes between about 10 and about 25 mole percent $Na_2O$, between about 10 and about 25 mole percent $K_2O$, between about 5 and about 15 mole percent $Al_2O_3$, between about 35 and about 50 mole percent $P_2O_5$, and between about 5 and about 15 mole percent of one or both PbO and BaO. The composition may also include up to about 5 mole percent $Fe_2O_3$ and up to about 10 mole percent $B_2O_3$.

These and other features and advantages of the present invention will become apparent to those skilled in the art upon a reading of the following detailed description wherein there are described illustrative embodiments of the invention.

DETAILED DESCRIPTION OF THE INVENTION

The present invention relates to a family of high thermal expansion alkali aluminophosphate glass compositions for hermetically sealing to high expansion materials such as copper, stainless steels, aluminum alloys, and copper/beryllium alloys. In general, each of the glass compositions comprises the following constituents: $Na_2O$, $K_2O$, $Al_2O_3$, $P_2O_5$, and one or both of PbO and BaO. Other constituents which may be present are $Fe_2O_3$ and $B_2O_3$. More particularly, each composition comprises between about 10 and about 25 mole percent $Na_2O$, between about 10 and about 25 mole percent $K_2O$, between about 5 and 15 mole percent $Al_2O_3$, between about 35 and about 50 mole percent $P_2O_5$, and between about 5 and about 15 mole percent of one or both PbO and BaO. Each glass composition may also comprise up to 5 mole percent $Fe_2O_3$ and up to 10 mole percent $B_2O_3$. These glass compositions have a thermal expansion coefficient in a range of between about 160 and $210 \times 10^{-7}$/° C. measured from room temperature to 325° C., a glass dissolution rate in a range of between about $2 \times 10^{-7}$ and $2 \times 10^{-9}$ g/cm$^2$-min in 70° C. deionized water and a transition temperature in a range of between about 350° and about 410° C.

Preferred compositions within the above component ranges can be described as follows:

Glass composition I comprises 18 mole percent $Na_2O$, 19 mole percent $K_2O$, 9 mole percent BaO, 5 mole percent $Fe_2O_3$, 12 mole percent $Al_2O_3$, and 37 mole percent $P_2O_5$. This composition has a thermal expansion coefficient of about $190 \times 1.^{-7}/°$ C. measured from room temperature to 325° C., a glass dissolution rate of about $4 \times 10^{-9}$ g/cm$^2$-min in 70° C. deionized water, a transition temperature of about 364° C. and a crystallization temperature of about 526° C. As known in the art, the difference between the crystallization temperature and the transition temperature (delta T) is representative of the glass formability. A greater (delta T) generally indicates that the glass is less prone to crystallization during high temperature processing, including hermetic sealing. It has been found that this composition is particularly suitable for hermetically sealing to stainless steel and Cu/Be alloys.

Glass composition II comprises 18 mole percent $Na_2O$, 18 mole percent $K_2O$, 9 mole percent BaO, 5 mole percent $Fe_2O_3$, 9 mole percent $Al_2O_3$, and 45 mole percent $P_2O_5$. This composition has a thermal expansion coefficient of about $203 \times 10^{-7}/°$ C. measured from room temperature to 325° C., a glass dissolution rate of about $2 \times 10^{-7}$ g/cm$^2$-min in 70° C. deionized water, a transition temperature of about 361° C. and a crystallization temperature of about 562° C. This composition is also suitable for hermetically sealing to aluminum alloys.

Glass composition III comprises 18 mole percent $Na_2O$, 19 mole percent $K_2O$, 9 mole percent PbO, 5 mole percent $Fe_2O_3$, 6 mole percent $B_2O_3$, 6 mole percent $Al_2O_3$ and 37 mole percent $P_2O_5$. This composition has a thermal expansion coefficient of about $187 \times 10^{-7}/°$ C. measured from room temperature to 325° C., a glass dissolution rate of about $2 \times 10^{-7}$ g/cm$^2$-min in 70° C. deionized water, a transition temperature of about 372° C., and a crystallization temperature of about 587° C. Like glass compositions I and II, glass composition III is suitable for hermetically sealing to aluminum alloys.

Glass composition IV comprises 18 mole percent $Na_2O$, 19 mole percent $K_2O$, 9 mole percent BaO, 4 mole percent $Fe_2O_3$, 10 mole percent $Al_2O_3$ and 40 mole percent $P_2O_5$. This composition has a thermal expansion coefficient of about $187 \times 10^{-7}/°$ C. measured from room temperature to 325° C., a glass dissolution rate of about $6 \times 10^{-9}$ g/cm$^2$-min in 70° C. deionized water, a transition temperature of about 382° C., and a crystallization temperature of about 560° C. Composition IV is suitable for hermetically sealing to aluminum alloys.

Glass composition V comprises 18 mole percent $Na_2O$, 19 mole percent $K_2O$, 9 mole percent PbO, 6 mole percent $B_2O_3$, 8 mole percent $Al_2O_3$, and 40 mole percent $P_2O_5$. This composition has a thermal expansion coefficient of about $200 \times 10^{-7}/°$ C. measured from room temperature to 325° C., a glass dissolution rate of about $8 \times 10^{-8}$ g/cm$^2$-min in 70° C. deionized water, a transition temperature of about 371° C., and a crystallization temperature of about 581° C. This glass composition has been found to be particularly suitable for hermetically sealing to aluminum alloys such as Al-4043.

Glass composition VI comprises 17.3 mole percent $Na_2O_3$, 18.2 mole percent $K_2O$, 8.6 mole percent PbO, 4 mole percent $Fe_2O_3$, 5.8 mole percent $B_2O_3$, 7.7 mole percent $Al_2O_3$, and 38.4 mole percent $P_2O_5$. This composition has a thermal expansion coefficient of about $178 \times 10^{-7}/°$ C. measured from room temperature to 325° C., a glass dissolution rate of about $6 \times 10^{-9}$ g/cm$^2$-min in 70° C. deionized water, a transition temperature of about 382° C., and a crystallization temperature of about 603° C. This composition is particularly suitable for hermetically sealing to stainless steel alloys such as 300 series stainless steel and to Cu/Be alloys.

Glass composition VII comprises 15 mole percent $Na_2O$, 18 mole percent $K_2O$, 9 mole percent PbO, 6 mole percent $B_2O_3$, 12 mole percent $Al_2O_3$, and 40 mole percent $P_2O_5$. This composition has a thermal expansion coefficient of about $179 \times 10^{-7}/°$ C. measured from room temperature to 325° C., a glass dissolution rate of about $3 \times 10^{-9}$ g/cm$^2$-min in 70° C. deionized water, a transition temperature of about 391° C., and a crystallization temperature of about 631° C. Like composition VI, composition VII is particularly suitable for hermetically sealing to stainless steel alloys such as 300 stainless steel and to Cu/Be alloys.

Each of these preferred glass compositions may be made by conventional melt techniques. Raw materials are melted in crucibles in air at temperatures around 1200° C. for up to 5 hours. Alumina crucibles contaminate the glass. Platinum crucibles are preferred.

The thermal expansion coefficients of the glass compositions, determined by dilatometry, were calculated from the total glass expansion measured from room temperature to just below the glass transition temperature. The dissolution rates were determined from weight changes, normalized to sample surface areas, after specified times in 100 ml of deionized water at 70° C.

Each of the glass compositions described herein has been hermetically sealed to either stainless steel, Cu/Be alloys or aluminum alloys. Although a certain degree of reactivity at the glass/alloy interface has been noted resulting in the formation of bubbles and other reaction products, the development of these interfacial heterogeneities does not preclude the formation of satisfactory glass/alloy hermetic seals. In addition, each of these glasses has significantly better aqueous durability than presently known high thermal expansion phosphate-based glasses and thus can be used in hermetic sealing applications requiring extended operating lifetimes.

It is thought that the present invention and many of its attendant advantages will be understood from the foregoing description and it will be apparent that various changes may be made in the form of the invention described herein without departing from its spirit and scope or sacrificing all of its material advantages, the forms hereinbefore described being preferred or exemplary embodiments thereof.

We claim:

1. A glass composition for hermetically sealing to high expansion metals comprising between about 10 and about 25 mole percent $Na_2O$, between about 10 and about 25 mole percent $K_2O$, between about 5 and about 15 mole percent $Al_2O_3$, between about 35 and about 50 mole percent $P_2O_5$, $Fe_2O_3$ in a concentration not exceeding 5 mole percent, and between about 5 and about 15 mole percent of one of PbO, BaO and a mixture thereof.

2. A glass composition for hermetically sealing to high expansion metals comprising between about 10 and about 25 mole percent $Na_2O$, between about 10 and about 25 mole percent $K_2O$, between about 5 and about 15 mole percent $Al_2O_3$, between about 35 and about 50 mole percent $P_2O_5$, $B_2O_3$ in a concentration not exceeding 10 mole percent, and between about 5 and about 15 mole percent of one of PbO, BaO and a mixture thereof.

3. The composition as recited in claim 1, wherein said composition includes $Fe_2O_3$ in a concentration not exceeding 5 mole percent, and further comprises 10 mole percent $B_2O_3$ in a concentration not exceeding 10 mole percent.

4. The glass composition as recited in claim 1, wherein said composition comprises 18 mole percent $Na_2O$, 19 mole percent $K_2O$, 9 mole percent BaO, 5 mole percent $Fe_2O_3$, 12 mole percent $Al_2O_3$ and 37 mole percent $P_2O_5$.

5. The glass composition as recited in claim 1, wherein said composition includes 18 mole percent $Na_2O$, 18 mole percent $K_2O$, 9 mole percent BaO, 5 mole percent $Fe_2O_3$, 9 mole percent $Al_2O_3$ and 45 mole percent $P_2O_5$.

6. The glass composition as recited in claim 3, wherein said composition includes 18 mole percent $Na_2O$, 19 mole percent $K_2O$, 9 mole percent PbO, 5 mole percent $Fe_2O_3$, 6 mole percent $B_2O_3$, 6 mole percent $Al_2O_3$ and 37 mole percent $P_2O_5$.

7. The glass composition as recited in claim 1, wherein said composition includes 18 mole percent $Na_2O$, 19 mole percent $K_2O$, 9 mole percent BaO, 4 mole percent $Fe_2O_3$, 10 mole percent $Al_2O_3$ and 40 mole percent $P_2O_5$.

8. The glass composition as recited in claim 2, wherein said composition includes 18 mole percent $Na_2O$, 19 mole percent $K_2O$, 9 mole percent PbO, 6 mole percent $B_2O_3$, 8 mole percent $Al_2O_3$ and 40 mole percent $P_2O_5$.

9. The glass composition as recited in claim 3, wherein said composition includes 17.3 mole percent $Na_2O$, 18.2 mole percent $K_2O$, 8.6 mole percent PbO, 4 mole percent $Fe_2O_3$, 5.8 mole percent $B_2O_3$, 7.7 mole percent $Al_2O_3$ and 38.4 mole percent $P_2O_5$.

10. The glass composition as recited in claim 2, wherein said composition includes 15 mole percent $Na_2O$, 18 mole percent $K_2O$, 9 mole percent PbO, 6 mole percent $B_2O_3$, 12 mole percent $Al_2O_3$ and 40 mole percent $P_2O_5$.

* * * * *